(12) United States Patent
Ishida et al.

(10) Patent No.: US 10,211,718 B2
(45) Date of Patent: Feb. 19, 2019

(54) POWER SUPPLY WHICH STARTS OR STOPS BOOSTING BASED ON AN UNBALANCED STATE OF THE AC SOURCE

(71) Applicant: Toshiba Carrier Corporation, Kawasaki-shi, Kanagawa (JP)

(72) Inventors: Keiichi Ishida, Fuji (JP); Akihiro Ishigaya, Fuji (JP); Masayuki Yoshimura, Fuji (JP)

(73) Assignee: TOSHIBA CARRIER CORPORATION, Kawasaki-shi (JP)

( * ) Notice: Subject to any disclaimer, the term of this patent is extended or adjusted under 35 U.S.C. 154(b) by 0 days.

(21) Appl. No.: 15/953,963

(22) Filed: Apr. 16, 2018

(65) Prior Publication Data
US 2018/0301972 A1    Oct. 18, 2018

(30) Foreign Application Priority Data

Apr. 17, 2017   (JP) .................................. 2017-081431

(51) Int. Cl.
| | |
|---|---|
| *H02M 7/04* | (2006.01) |
| *H02M 1/08* | (2006.01) |
| *H02M 5/458* | (2006.01) |
| *H02M 1/00* | (2006.01) |

(52) U.S. Cl.
CPC ............ *H02M 1/08* (2013.01); *H02M 5/458* (2013.01); *H02M 2001/0032* (2013.01); *H02M 2001/0051* (2013.01); *H02M 2001/0054* (2013.01)

(58) Field of Classification Search
CPC ....... H02M 2001/0032; H02M 7/2176; H02M 5/458; H02M 1/4225; H02M 7/04
See application file for complete search history.

(56) References Cited

U.S. PATENT DOCUMENTS

| | | | | |
|---|---|---|---|---|
| 5,793,623 A | * | 8/1998 | Kawashima | ........ H02M 1/4225 363/36 |
| 2016/0294312 A1 | * | 10/2016 | Tsumura | ............... H02M 5/458 |
| 2016/0318404 A1 | * | 11/2016 | Kumazawa | ......... B60L 11/1807 |

FOREIGN PATENT DOCUMENTS

| | | |
|---|---|---|
| JP | 2010-187521 A | 8/2010 |
| JP | 2015-156795 A | 8/2015 |

* cited by examiner

*Primary Examiner* — Harry R Behm
(74) *Attorney, Agent, or Firm* — John P. White; Cooper & Dunham LLP

(57) ABSTRACT

According to one embodiment, when an effective value of an input current flowing into a booster circuit rises to a value greater than or equal to a second set value, boosting of the booster circuit is started and, after the start, when the effective value lowers to a value lower than a first set value lower than the second set value, boosting of the booster circuit is stopped. Then, if the three-phase AC source is in an unbalanced state, the first set value is set to a value lower than usual.

20 Claims, 3 Drawing Sheets

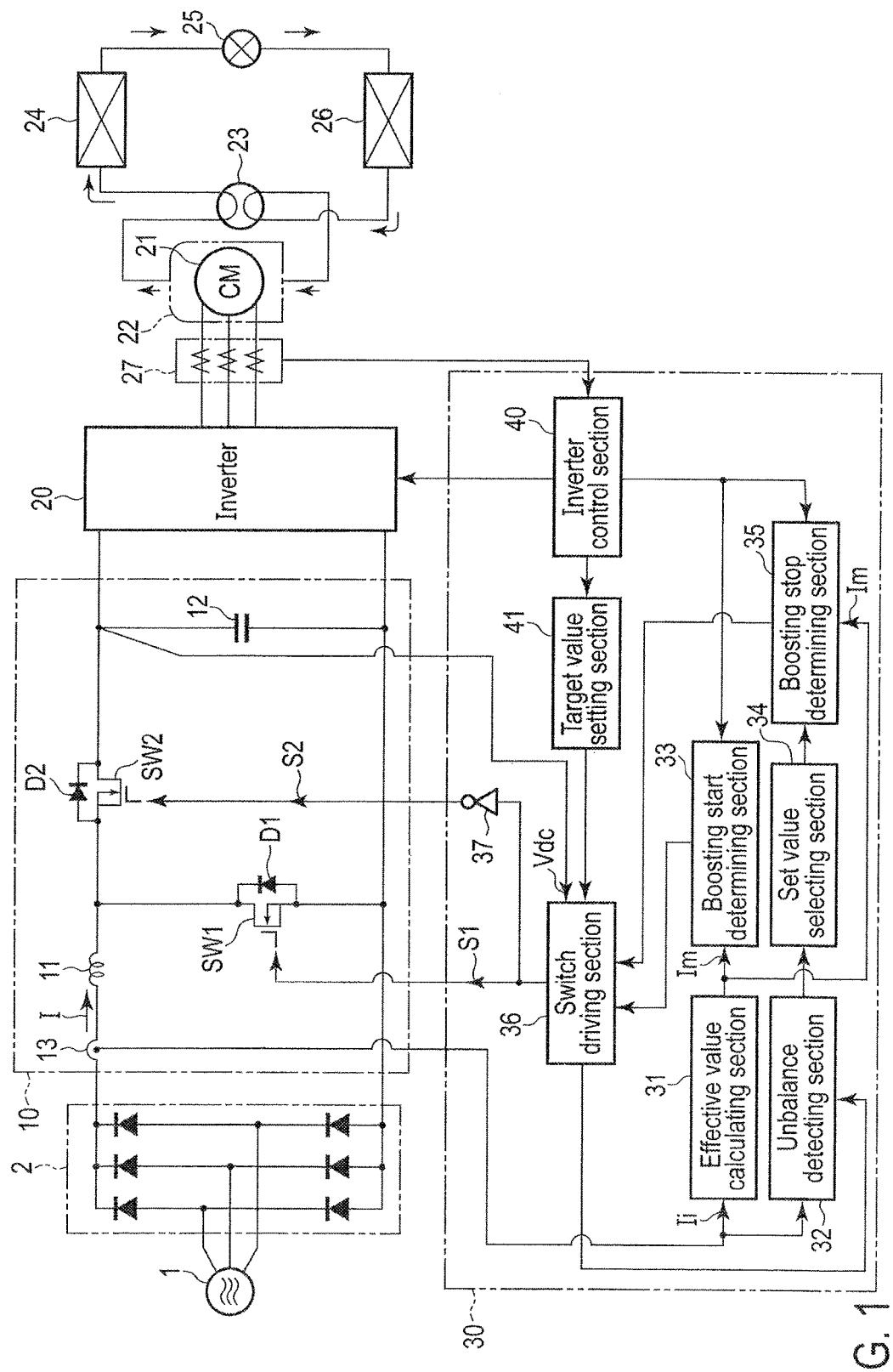
F I G. 1

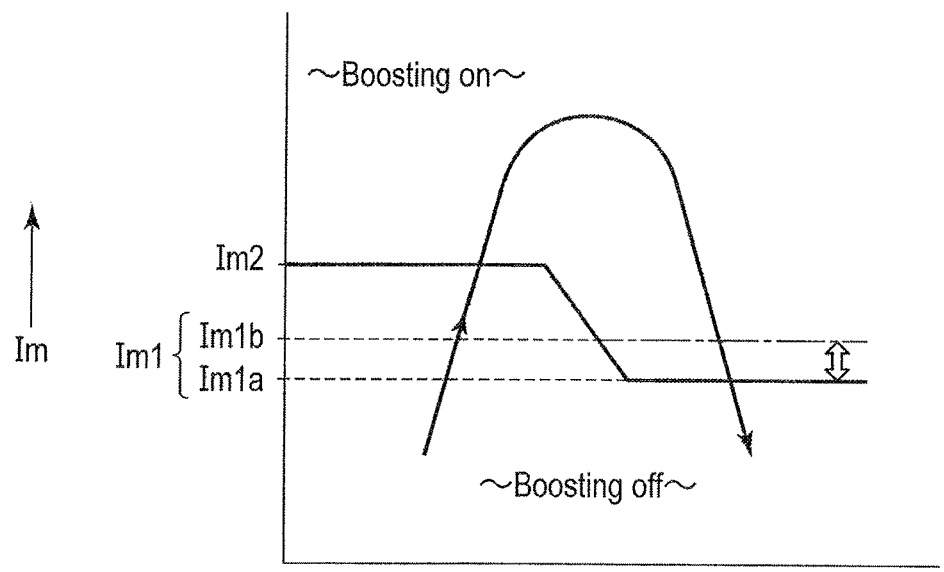
F I G. 3
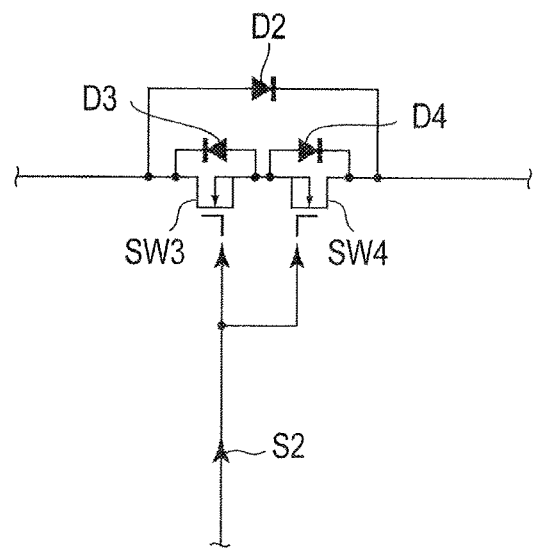
F I G. 4

POWER SUPPLY WHICH STARTS OR STOPS BOOSTING BASED ON AN UNBALANCED STATE OF THE AC SOURCE

CROSS-REFERENCE TO RELATED APPLICATIONS

This application is based upon and claims the benefit of priority from Japanese Patent Application No. 2017-081431, filed Apr. 17, 2017, the entire contents of which are incorporated herein by reference.

FIELD

Embodiments described herein relate generally to a power supply apparatus to be incorporated in, for example, an air conditioning apparatus, a heat source apparatus, and the like.

BACKGROUND

A power supply apparatus to be incorporated in an air conditioning apparatus, heat source apparatus, and the like includes a rectifier circuit configured to rectify voltages of an AC source, booster circuit configured to boost an output voltage of the rectifier circuit, and inverter configured to convert an output voltage of the booster circuit into AC voltages of a predetermined frequency, and drives a compressor motor of a refrigerating cycle in the air conditioning apparatus or heat source apparatus by using the output of the inverter.

The booster circuit described above is a so-called boost chopper including a series circuit of a reactor and first switch element to be connected to output ends of the above rectifier circuit, diode for backflow prevention provided in a current path between the first switch element and load (aforementioned inverter), and capacitor or the like connected in parallel with the load, boosts the output voltage of the rectifier circuit by repeating turning on/off of the first switch element, and outputs the output voltage of the rectifier circuit without boosting the output voltage by continuously keeping the first switch element in the off-state.

In a power supply apparatus provided with such a booster circuit, control is carried out in such a manner that when the load is increased and an effective value of an input current flowing into the booster circuit rises to a value greater than or equal to a set value (state where the counter-electromotive force of the compressor motor increases to such an extent that inverter control for increasing the rotational speed of the compressor motor reaches a maximum), boosting of the booster circuit is started and, when the load is decreased and the effective value of the input current flowing into the booster circuit lowers to a value less than the set value, boosting of the booster circuit is stopped. As the aforementioned set value, each of a second set value for a boosting start and first set value for a boosting stop lower than the second set value is used. A difference between the second set value and first set value is a hysteresis width used to prevent frequent repetitions of a boosting start and boosting stop from occurring.

In order to reduce switching loss of the booster circuit to the extent possible, it is advisable to make the first set value for a boosting stop close as possible to the second set value for a boosting start. By making the first set value close to the second set value, the timing of the boosting stop is brought forward, and the period of boosting is reduced correspondingly, whereby it is possible to reduce the switching loss (for example, JP 2010-187521 A).

However, when the magnitude of the input current flowing into the booster circuit of the case where the AC source voltage or frequency is in an unbalanced state at the time of boosting is compared with the magnitude thereof at the time of non-boosting, the magnitude at the time of non-boosting is greater than the magnitude at the time of boosting under the same load conditions.

Accordingly, when setting is made in such a manner that the first set value is close to the second set value, if the AC source is in the unbalanced state, at the time of a boosting stop, the effective value of the input current rises immediately after the boosting stop, and the effective value reaches the second set value for a boosting start, whereby boosting is immediately started. That is, a stop of boosting and start of boosting are repeated within a short period of time. This adversely affects the lifetime of each electronic component of the booster circuit.

BRIEF DESCRIPTION OF THE DRAWINGS

FIG. 1 is a block diagram showing the configuration of an embodiment.

FIG. 3 is a view showing a boosting start/stop condition in the embodiment.

FIG. 4 is a view showing the configuration of a main part of a modification example of the embodiment.

DETAILED DESCRIPTION

Figure 2:
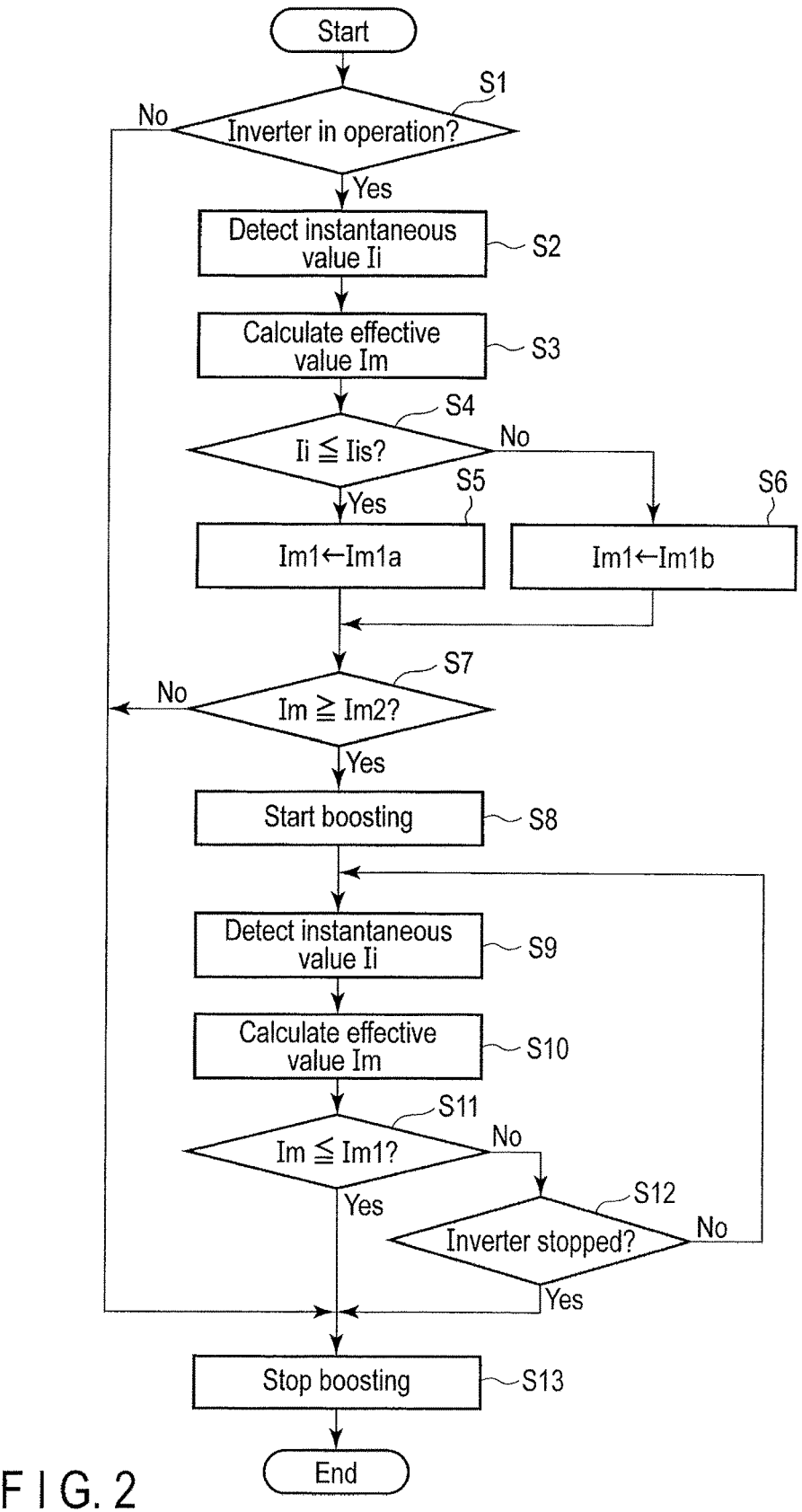
FIG. 2 is a flowchart showing control of a controller in the embodiment.

In general, according to one embodiment, a power source apparatus includes; a rectifier circuit configured to rectify voltages of a three-phase AC source; a booster circuit including a series circuit of a reactor and a first switch element to be connected to output ends of the rectifier circuit, a diode for backflow prevention provided in a current path between the first switch element and a load, and a capacitor connected in parallel with the load, and configured to boost an output voltage of the rectifier circuit by turning on/off of the first switch element, and output the output voltage of the rectifier circuit without boosting the output voltage by continuously keeping the first switch element in the off-state; and a controller configured to, when an effective value of an input current flowing into the booster circuit rises to a value greater than or equal to a second set value, start boosting of the booster circuit and, after the start, when the effective value lowers to a value lower than a first set value lower than the second set value, stop boosting of the booster circuit and, if the three-phase AC source is in an unbalanced state, set the first set value to a value lower than usual.

Hereinafter, an embodiment of a power source apparatus to be incorporated in an air conditioning apparatus having a refrigerating cycle will be described.

As shown in FIG. 1, a full-wave diode bridge rectifier circuit 2 is connected to a three-phase AC source 1, and booster circuit 10 is connected to output ends of the full-wave rectifier circuit 2.

The booster circuit 10 includes a series circuit of a reactor 11 and switch element (first switch element) SW1 connected to the output ends of the full-wave rectifier circuit 2, diode (first diode) D1 inversely connected in parallel to the switch element SW1, diode (second diode) D2 for backflow prevention provided in the current path between the switch element SW1 and inverter 20 which is a load, switch element SW2 (second switch element) connected in parallel to the diode D2, and capacitor (electrolytic capacitor) 12 connected in parallel to the load, boosts the output voltage (DC voltage) of the full-wave rectifier circuit 2 by turning on/off (intermittently turning on) of the switch element SW1 and turning on/off (intermittently turning on) of the switch element SW2 180° out of phase with the turning on/off of the switch element SW1 (boosting mode), and outputs the output voltage of the full-wave rectifier circuit 2 without boosting the output voltage by keeping the switch element SW1 in the off-state (continuous off-state) and keeping the switch element SW2 in the on-state (continuous on-state) (non-boosting mode).

The switch element SW1 is a super-junction MOSFET having the aforementioned diode D1 as a parasitic diode, and is on/off-driven by a drive signal (on/off signal) S1 to be supplied from a controller 30. The switch element SW2 is, for example, a small-capacity (rating) MOSFET having the aforementioned diode D2 for backflow prevention as a parasitic diode, having bidirectionality allowing a current to flow in both directions between the drain and source thereof in the on-state, and in which the power loss in the on-state becomes less than the power loss of the diode D2 due to a voltage drop in the forward direction, and is on-off driven by a drive signal (on/off signal) S2 to be supplied from the controller 30 180° out of phase with the turning on/off of the switch element SW1. It should be noted that both or one of the switch elements SW1 and SW2 may be made a SiC-MOSFET which is the next-generation device having a low on-state resistance value.

The inverter 20 which is a load is connected to the output ends of the booster circuit 10. The inverter 20 converts the output voltage of the booster circuit 10 into AC voltages by switching, and outputs the AC voltages as the drive power for the compressor motor 21. The compressor motor 21 is a motor (for example, a brushless DC motor) used to drive the compressor 22.

The compressor 22 sucks and compresses a refrigerant, and discharges the compressed refrigerant.

One end of an outdoor heat exchanger 24 is connected to the refrigerant discharge port of the compressor 22 through a four-way valve 23, and the other end of the outdoor heat exchanger 24 is connected to one end of an indoor heat exchanger 26 through an expansion valve 25. The other end of the indoor heat exchanger 26 is connected to the refrigerant suction port of the compressor 22 through the four-way valve 23. The compressor 22, four-way valve 23, outdoor heat exchanger 24, expansion valve 25, and indoor heat exchanger 26 constitute a heat pump refrigerating cycle of the air conditioning apparatus. Arrows in FIG. 1 show the flow of the refrigerant at the time of cooling (refrigerated air conditioning), and the high-temperature refrigerant discharged from the compressor absorbs heat in the indoor heat exchanger 26 to cool the inside of the room and radiates heat in the outdoor heat exchanger 24. That is, the indoor heat exchanger 26 serves as a heat absorber and outdoor heat exchanger 24 serves as a heat radiator. When the four-way valve is inverted, the flow of the refrigerant is inverted, whereby a heating operation is enabled. In this case, the refrigerant radiates heat in the indoor heat exchanger 26 to warm the inside of the room and absorbs heat in the outdoor heat exchanger 24.

In the current path between the positive-side output end of the full-wave rectifier circuit 2 and reactor 11 of the booster circuit 10, a current sensor 13 configured to detect an instantaneous value Ii of the input current I flowing into the booster circuit 10 is arranged. In the current path between the inverter 20 and compressor motor 21, a current sensor 27 configured to detect currents (phase winding currents) flowing through the compressor motor 21 is arranged. Detection results of these current sensors 13 and 27 are supplied to the controller 30, and output voltage (voltage across both the terminals of the capacitor 12) Vdc of the booster circuit 10 is detected by the controller (control means) 30.

The controller 30 includes an effective value calculating section 31, unbalance detecting section 32, boosting start determining section 33, set value selecting section 34, boosting stop determining section 35, switch driving section 36, inverting section 37, inverter control section 40, target value setting section 41, and subtracting section 42 and, when the effective value Im of the input current I flowing into the booster circuit 10 rises to a value greater than or equal to a set value (second set value) Im2, starts boosting of the booster circuit 10 and, after this starting, when the effective value Im lowers to a value lower than a set value (first set value) Im1 lower than the above set value Im2, stops boosting of the booster circuit 10 and sets, if the three-phase AC source 1 is in the unbalanced state, the set value Im1 to a value lower than usual. Regarding this setting, more specifically, when the three-phase AC source 1 is in the balanced state, a predetermined value (second predetermined value) Im1$b$ close to the set value Im2 is selected as the set value Im1 and, when the three-phase AC source 1 in the unbalanced state, a predetermined value (first predetermined value) Im1$a$ lower than the above predetermined value Im1$b$ is selected as the set value Im1.

The effective value calculating section 31 calculates the effective value Im of the input current I on the basis of values corresponding to several cycles of the instantaneous value Ii of the input current I detected by the current sensor 13. The unbalance detecting section 32 detects an unbalanced state of the voltage or frequency of the three-phase AC source 1 on the basis of the instantaneous value Ii of the input current I detected by the current sensor 13. In this embodiment, more specifically, it is recognized that the booster circuit 10 is in the non-boosting state through the switch driving section 36, the instantaneous value Ii of the input current I detected by the current sensor 13 at the time of non-boosting of the booster circuit 10 and predetermined reference value Iis are compared with each other and, when the instantaneous value Ii becomes lower than or equal to the reference value Iis (Ii≤Iis) in a period of half a cycle or more of the three-phase AC source 1, it is determined that the three-phase AC source 1 is in the unbalanced state and, when the instantaneous value Ii is greater than the reference value Iis (Ii>Iis) at all times, it is determined that the three-phase AC source 1 is not in the unbalanced state.

That is, when in the unbalanced state of the voltage or frequency of the three-phase AC source 1, a load is created by the operation of the inverter 20, a current of one of the phases of the three-phase AC source 1 does not rise unlike the normal state and is insufficient in the magnitude, and currents corresponding to the shortfall value additionally flow through the other two phases. Accordingly, in a period of half a cycle of the three-phase AC source 1, in the unbalanced state in comparison with the normal state, the timing at which the instantaneous value Ii of the input current I is largely lowered occurs. On the basis of this phenomenon, the unbalance detecting section 32 detects the unbalanced state of the three-phase AC source 1 from the instantaneous value Ii of the input current I. On the other hand, while the booster circuit 10 carries out a boosting operation, switching timing is controlled in such a manner that currents uniformly flow through all the phases of the three-phase AC source 1, and hence even when the three-phase AC source 1 is in the unbalanced state, instantaneous values of currents in all the phases become approximately equal to each other. Accordingly, while the booster circuit 10 carries out the boosting operation, an unbalanced state cannot be detected from the instantaneous value Ii of the input current I.

The boosting start determining section 33 compares, at the time of operation of the inverter 20, the effective value Im to be calculated by the effective value calculating section 31 and the predetermined set value (second set value) Im2 for the boosting start with each other and, when the effective value Im rises to a value greater than or equal to the set value Im2 (Im≥Im2), issues a boosting start instruction.

The set value selecting section 34 previously stores therein the predetermined value (second predetermined value) Im1$b$ which is a value lower than the set value Im2 and is close to the set value Im2, and predetermined value (first predetermined value) Im1$a$ which is a value lower than the predetermined value Im1$b$ and, when an unbalanced state is not detected by the unbalance detecting section 32, selects the higher predetermined value Im1$b$ as the set value Im1 for the boosting stop and, when an unbalanced state is detected by the unbalance detecting section 32, selects the lower predetermined value Im1$a$ as the set value (first set value) Im1 for the boosting stop.

The boosting stop determining section 35 compares, at the time of operation of the inverter 20, the effective value Im calculated by the effective value calculating section 31 and set value Im1 selected by the set value selecting section 34 with each other and, when the effective value Im lowers to a value lower than or equal to the set value Im1 (Im≤Im1), issues a boosting stop instruction.

Upon receipt of the boosting start instruction from the boosting start determining section 33, the switch driving section 36 issues a drive signal S1 to thereby start (on) boosting of the booster circuit 10, and controls (PWM control) the on/off duty ratio of the drive signal S1 for the switch element SW1 in such a manner that the output voltage Vdc of the booster circuit 10 becomes coincident with the target value Vdcref notified from the target value setting section 41. Further, upon receipt of the boosting stop instruction from the boosting stop determining section 35, the switch driving section 36 stops the output of the drive signal S1 to thereby stop (off) boosting of the booster circuit 10.

The inverting section 37 receives the drive signal S1 issued from the switch driving section 36, and outputs a drive signal S2 forming an on/off waveform 180° out of phase with the drive signal S1 to the switch element SW2.

The inverter control section 40 estimates the speed (rotational speed) of the compressor motor 21 from the detected current (motor current) of the current sensor 27, and subjects the switching of the inverter 20 to PWM control in such a manner that the estimated rotational speed becomes the target rotational speed corresponding to the magnitude of the refrigeration load. The target value setting section 41 sets the minimum output voltage Vdc of the booster circuit 10 necessary for the output voltage of the inverter 20 to obtain the aforementioned target rotational speed as the target value Vdcref. The target value Vdcref is a value to be set according to the magnitude of the refrigeration load and is set low in the case of a low refrigeration load where the compressor motor 21 enters the low rotational state, and is set higher with an increase in the refrigeration load when the rotational speed of the compressor motor 21 becomes higher.

The aforementioned full-wave rectifier circuit 2, booster circuit 10, inverter 20, current sensor 27, controller 30, and the like constitute the power supply apparatus of this embodiment.

An operation of this power supply apparatus will be described below with reference to the flowchart of FIG. 2 and boosting start/stop condition of FIG. 3. Regarding steps S1, S2, . . . of the flowchart, these are simply abbreviated as S1, S2 . . . .

When the inverter 20 is operated (YES in S1), the controller 30 detects the instantaneous value Ii of the input current I in a predetermined period (for example, half a cycle or more of the source voltage) (S2), and calculates the effective value Im of the input current I from the instantaneous value Ii of the predetermined period (S3). Then, the controller 30 compares the detected instantaneous value Ii of the predetermined period and reference value Iis with each other (S4).

When the instantaneous value Ii is greater than the reference value Iis at all times (Ii>Iis; NO of S4), the controller 30 selects the higher predetermined value Im1$b$ as the set value Im1 for the boosting stop on the basis of the determination that the three-phase AC source 1 is not in the unbalanced state (S6). When there is the timing at which the instantaneous value Ii becomes lower than or equal to the reference value Iis (Ii≤Iis; YES of S4), the controller selects the lower predetermined value Im1$a$ as the set value Im1 for the boosting stop on the basis of the determination that the three-phase AC source 1 is in the unbalanced state (S5).

Subsequently, the controller 30 compares the above calculated effective value Im and set value Im2 for the boosting start with each other (S7). When the effective value Im is less than the set value Im2 (Im<Im2; NO of S7), the controller 30 determines that boosting is not necessary, continues the boosting-stopped state of the booster circuit 10 (S13), and then repeats the processing from S1.

With an increase in the rotational speed of the compressor motor 21, the input current I flowing into the booster circuit 10 becomes larger. When the rotational speed of the compressor motor 21 further increases, and the counter-electromotive force of the compressor motor 21 becomes larger, inverter control for increasing the rotational speed of the compressor motor 21 reaches a maximum and, at that point in time, the effective value Im of the input current I increases to a value greater than or equal to the set value Im2 (Im≥Im2; YES of S7). At this time, the controller 30 starts boosting (switching) of the booster circuit 10 (S8). By this boosting, it becomes possible to continue inverter control for increasing the rotational speed of the compressor motor 21 irrespective of the increase in the counter-electromotive force of the compressor motor 21.

Along with the start of the boosting, the controller 30 detects the instantaneous value Ii of the input current I in a predetermined period (for example, half a cycle or more of the source voltage) (S9), and calculates the effective value Im of the input current I from the instantaneous value Ii of the predetermined period (S10). Then, the controller 30 compares the calculated effective value Im and set value Im1 for the boosting stop with each other (S11).

When the effective value Im is in a state where the value Im is greater than the set value Im1 (Im>Im1; NO of S11), the controller 30 repeats the processing from S9 while continuing boosting of the booster circuit 10 on condition that the inverter 20 is not in the operation-stopped state (NO of S12). However, if the inverter 20 is in the operation-stopped state (YES of S12), the controller 30 stops the boosting of the booster circuit 10 (S13).

When the rotational speed of the compressor motor 21 lowers, the input current I flowing into the booster circuit 10 also falls. In the state where the controller 30 repeats the processing from S9 to S12 while continuing boosting of the booster circuit 10, when the effective value Im falls to a value smaller than or equal to the set value Im1 (Im≤Im1; YES of S11), the controller stops boosting of the booster circuit 10 on the basis of the determination that the compressor motor 21 can be driven without boosting (S13). By the stop of the boosting, it is possible to eliminate the useless switching of the booster circuit 10 and reduce the switching loss thereof.

As described above, at the time of the normal state where the three-phase AC source 1 is not in the unbalanced state, the predetermined value Im1$b$ close to the set value Im2 for the boosting start is selected as the set value Im1 for the boosting stop, whereby the timing of the boosting stop is made earlier, the period of boosting is reduced correspondingly, and thus it is possible to reduce the switching loss. At the time of the normal state where the three-phase AC source 1 is not in the unbalanced state, from the fact that the effective value Im of the input current I exhibits an approximately identical value during the period of boosting and before and after the boosting stop as long as the inverter output remains unchanged, even when the set value Im1$b$ for the boosting stop is set to a value slightly lower than the set value Im2 for the boosting start, the value being obtained by subtracting an amount corresponding to the hysteresis from the set value Im2, the effective value Im of the input current I never exceeds the set value Im2 immediately after the boosting stop to cause boosting to be started.

On the other hand, when the three-phase AC source is in the unbalanced state, the predetermined value Im1$a$ lower than the predetermined value Im1$b$ of the normal times is selected as the set value Im1 for the boosting stop, and hence when the effective value Im falls to a value lower than or equal to the set value Im1, and boosting of the booster circuit 10 is stopped, even if the effective value Im of the input current rises concomitantly with the stop, the effective value Im does not reach the set value Im2 for the boosting start. Accordingly, boosting of the booster circuit 10 is not started again immediately. As a result, the drawback that the stop and start of boosting of the booster circuit 10 are repeated in a short period of time can be prevented from occurring. Thereby, the lifetimes of electronic components of the booster circuit 10 such as the switch elements SW1 and SW2, and the like are not adversely affected.

It should be noted that when the predetermined value Im1$b$ identical to the normal state is made the set value Im1 for the boosting stop also in the unbalanced state, as soon as the boosting is stopped, large currents begins to flow into two phases of the three-phase AC current source, the two phases being vulnerable to excessive currents, thus the effective value Im of the input current I rises to a value greater than or equal to the set value Im2 within an extremely short period of time, and thus the boosting and boosting stop of the booster circuit 10 are frequently repeated.

Further, in the above embodiment, although the configuration is contrived in such a manner that the unbalanced state of the three-phase AC source is detected by comparing the instantaneous value Ii of the input current I and specified value Iis with each other, the detecting means is not limited, and various types of detecting means can be employed.

Further, as shown in FIG. 4, in place of the switch element SW2, a series circuit of a switch element (preceding stage switch element) SW3 and switch element (subsequent stage switch element) SW4 may be provided. The switch elements SW3 and SW4 are tuned on/off by a drive signal S2 in synchronism with each other. Regarding the diode D2 for backflow prevention, the switch element SW2 is not provided, and hence new diodes for backflow prevention are provided.

The series circuit of the switch elements SW3 and SW4 is formed by connecting the switch elements SW3 and SW4 in series in opposite directions, and constitutes a high-efficiency switching circuit configured to prevent a reverse recovery current of the parasitic diode D4 of the switch element SW4 from flowing together with the diode D2 for backflow prevention. The high-efficiency switching circuit is a circuit corresponding to the semiconductor switching circuit described in JP 2015-156795 A, and the reverse recovery current of the parasitic diode D4 of the switch element SW4 is effectively prevented from flowing, whereby reduction in loss and enhancement of the switching speed are realized. By employing this high-efficiency switching circuit, the efficiency higher than the above embodiments can be obtained.

In this embodiment, it is determined that the three-phase AC source 1 is in the unbalanced state when the instantaneous value Ii of the input current I from the three-phase AC source in the non-boosted state is lower than or equal to the specified value Iis. In this system, it cannot be determined whether or not the three-phase AC source 1 is in the unbalanced state while the boosting operation is carried out. Accordingly, when the three-phase AC source 1 has entered the unbalanced state after a start of boosting or when the three-phase AC source 1 has been restored from the unbalanced state to the normal state after the start of boosting, it is not possible to detect such an event. When the unbalanced state of the three-phase AC source 1 is detected at all times even while boosting is carried out in order to obtain a stricter operation, it is sufficient if presence/absence of an unbalanced state of the three-phase AC source 1 is detected by using means for detecting the voltage values of the three-phase AC source 1 and detecting a phase shift of the voltage of the three-phase AC source 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A power supply apparatus comprising:
a rectifier circuit configured to rectify voltages of a three-phase AC source;
a booster circuit including a series circuit of a reactor and a first switch element to be connected to output ends of the rectifier circuit, a diode for backflow prevention provided in a current path between the first switch element and a load, and a capacitor connected in parallel with the load, and configured to boost an output voltage of the rectifier circuit by turning on/off of the first switch element, and output the output voltage of the rectifier circuit without boosting the output voltage by continuously keeping the first switch element in the off-state; and a controller configured to, when an effective value of an input current flowing into the booster circuit rises to a value greater than or equal to a second set value, start boosting of the booster circuit and, after the start, when the effective value lowers to a value lower than a first set value lower than the second set value, stop boosting of the booster circuit and, if the three-phase AC source is in an unbalanced state, set the first set value to a value lower than usual.

2. The apparatus of claim 1, wherein
when the three-phase AC source is not in the unbalanced state, the controller selects a second predetermined value close to the second set value as the first set value and, when the three-phase AC source is in the unbalanced state, selects a first predetermined value lower than the second predetermined value as the first set value.

3. The apparatus of claim 2, wherein
the controller detects an instantaneous value of the input current flowing into the booster circuit at the time of non-boosting of the booster circuit and, when the instantaneous value becomes lower than or equal to a specified value within a period of half a cycle or more of the three-phase AC source, determines that the three-phase AC source is in the unbalanced state.

4. The apparatus of claim 3, wherein
the load is an inverter configured to convert an output voltage of the booster circuit into AC voltages of a predetermined frequency.

5. The apparatus of claim 2, wherein
the booster circuit further includes a second switch element connected in parallel with a diode for backflow prevention, and boosts the output voltage of the rectifier circuit by turning on/off of the first switch element and turning on/off of the second switch element 180° out of phase with the turning on/off of the first switch element.

6. The apparatus of claim 5, wherein
the first switch element is a MOSFET including a first parasitic diode,
the second switch element is a MOSFET including a second parasitic diode, possesses bidirectionality allowing a current to flow in both directions in an on-state, and an on-state resistance value thereof is smaller than a resistance value of the second parasitic diode in the forward direction.

7. The apparatus of claim 6, wherein
the load is an inverter configured to convert an output voltage of the booster circuit into AC voltages of a predetermined frequency.

8. The apparatus of claim 5, wherein
the load is an inverter configured to convert an output voltage of the booster circuit into AC voltages of a predetermined frequency.

9. The apparatus of claim 2, wherein
the load is an inverter configured to convert an output voltage of the booster circuit into AC voltages of a predetermined frequency.

10. The apparatus of claim 1, wherein
the controller detects an instantaneous value of the input current flowing into the booster circuit at the time of non-boosting of the booster circuit and, when the instantaneous value becomes lower than or equal to a specified value in a period of half a cycle or more of the three-phase AC source, determines that the three-phase AC source is in the unbalanced state.

11. The apparatus of claim 10, wherein
the booster circuit further includes a second switch element connected in parallel with a diode for backflow prevention, and boosts the output voltage of the rectifier circuit by turning on/off of the first switch element and turning on/off of the second switch element 180° out of phase with the turning on/off of the first switch element.

12. The apparatus of claim 11, wherein
the first switch element is a MOSFET including a first parasitic diode,
the second switch element is a MOSFET including a second parasitic diode, possesses bidirectionality allowing a current to flow in both directions in an on-state, and an on-state resistance value thereof is smaller than a resistance value of the second parasitic diode in the forward direction.

13. The apparatus of claim 12, wherein
the load is an inverter configured to convert an output voltage of the booster circuit into AC voltages of a predetermined frequency.

14. The apparatus of claim 11, wherein
the load is an inverter configured to convert an output voltage of the booster circuit into AC voltages of a predetermined frequency.

15. The apparatus of claim 10, wherein
the load is an inverter configured to convert an output voltage of the booster circuit into AC voltages of a predetermined frequency.

16. The apparatus of claim 1, wherein
the booster circuit further includes a second switch element connected in parallel with a diode for backflow prevention, and boosts the output voltage of the rectifier circuit by turning on/off of the first switch element and turning on/off of the second switch element 180° out of phase with the turning on/off of the first switch element.

17. The apparatus of claim 16, wherein
the load is an inverter configured to convert an output voltage of the booster circuit into AC voltages of a predetermined frequency.

18. The apparatus of claim 16, wherein
the first switch element is a MOSFET including a first parasitic diode,
the second switch element is a MOSFET including a second parasitic diode, possesses bidirectionality allowing a current to flow in both directions in an on-state, and an on-state resistance value thereof is smaller than a resistance value of the second parasitic diode in the forward direction.

19. The apparatus of claim 18, wherein
the load is an inverter configured to convert an output voltage of the booster circuit into AC voltages of a predetermined frequency.

20. The apparatus of claim 1, wherein
the load is an inverter configured to convert an output voltage of the booster circuit into AC voltages of a predetermined frequency.

* * * * *